United States Patent
Han et al.

(10) Patent No.: US 12,237,735 B2
(45) Date of Patent: Feb. 25, 2025

(54) POTTING METHOD OF CORELESS MOTOR, POTTING TOOLING THEREOF AND CORELESS MOTOR

(71) Applicant: SUZHOU HEARTHILL MEDICAL TECHNOLOGY CO., LTD., Jiangsu (CN)

(72) Inventors: Liwei Han, Suzhou (CN); Xiaotian Tan, Suzhou (CN); Wenji Geng, Suzhou (CN); Xiaoshen Yan, Suzhou (CN)

(73) Assignee: SUZHOU HEARTHILL MEDICAL TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/885,139

(22) Filed: Sep. 13, 2024

(65) Prior Publication Data

US 2025/0015691 A1    Jan. 9, 2025

Related U.S. Application Data

(63) Continuation of application No. PCT/CN2024/095089, filed on May 24, 2024.

(30) Foreign Application Priority Data

May 30, 2023    (CN) .......................... 202310619325.7

(51) Int. Cl.
*H02K 15/12*    (2006.01)
*H02K 15/14*    (2006.01)

(52) U.S. Cl.
CPC ............ *H02K 15/12* (2013.01); *H02K 15/14* (2013.01); *H02K 2215/00* (2021.08); *Y10T 29/49009* (2015.01)

(58) Field of Classification Search
CPC .......... H02K 15/12; H02K 23/54; H02K 1/06; H02K 15/00; Y10T 29/49009
(Continued)

(56) References Cited

U.S. PATENT DOCUMENTS 9,755,463 B2 *   9/2017   Klassen ................... H02K 9/00
11,152,829 B2 * 10/2021   Yuan ....................... H02K 3/42

OTHER PUBLICATIONS

Chinese Notification of Grant of Invention Patent issued on Jul. 5, 2023, in corresponding Chinese Patent Application No. 202310619325. 7. (2 pages English, 2 pages Chinese).
(Continued)

*Primary Examiner* — Thiem D Phan
(74) *Attorney, Agent, or Firm* — NSIP Law

(57) ABSTRACT

The present disclosure provides a potting method of a coreless motor, a potting tooling thereof, and a coreless motor. Wherein the potting method includes the steps of providing a stator assembly and a housing, wherein the housing is sleeved on an outer wall of the stator assembly; providing a potting tooling, wherein the potting tooling includes a first potting fixture and a second potting fixture; inserting the first potting fixture into one end of the housing in an axial direction and inserting the second potting fixture into the other end of the housing in an axial direction to form a potting space; injecting glue into the potting space to form an encapsulation layer to encapsulate the stator assembly on the inner wall of the housing. With the potting method of the present disclosure, so as to improve the stability of the stator assembly in the potting process.

16 Claims, 10 Drawing Sheets

(58) Field of Classification Search
USPC .................................. 29/596, 598, 604, 607
See application file for complete search history.

(56) References Cited

OTHER PUBLICATIONS

International Searching Authority issued Written Opinion on Aug. 19, 2024, in corresponding International Application No. PCT/CN2024/095089. (5 pages in English, 4 pages in Chinese).

\* cited by examiner

B — B

POTTING METHOD OF CORELESS MOTOR, POTTING TOOLING THEREOF AND CORELESS MOTOR

TECHNICAL FIELD

The present disclosure relates to the technical field of a coreless motor, and more particularly to a potting method of a coreless motor, potting tooling thereof, and a coreless motor.

BACKGROUND ART

Coreless motor structure breaks through the traditional motor rotor structure, using an iron-core-free rotor, completely eliminating the iron core forming eddy current caused by the loss of electrical energy. Due to the structural change of the rotor, the operating characteristics of the motor are greatly improved, which not only has outstanding energy-saving characteristics but also has the control and traction characteristics that the iron-core motor cannot achieve.

The coreless motor overcomes the insurmountable technical obstacles of the iron core motor, and its prominent features focus on the main performance of the motor so that it has a broad application field. In particular, with the rapid development of industrial technology, higher expectations and requirements on the servo characteristics of the motor are continuously put forward, so that the coreless motor has an irreplaceable position in many applications.

The application of coreless motor has gradually developed into high precision and small volume after entering industrial and civil fields from military and high-tech fields.

1. A fast response follow-up system is needed. For example, highly sensitive recording and detection equipment, high-stability medical devices, industrial robots, etc. coreless motors can well meet their technical requirements.
2. Various aircraft, including aviation, aerospace, model airplane, etc. The weight of the aircraft can be minimized by utilizing the advantages of the coreless motor that is lightweight, small in size, and low in energy consumption.
3. Various domestic appliances. The use of a coreless motor as an actuator can result in improved product grades and superior performance.

The coreless motor needs to have the advantages of working in a variety of complex conditions, but at the same time, due to its small size and complex internal structure, the accuracy, consistency, and yield of the motor manufacturing process cannot be guaranteed. Especially in the potting process of a coreless motor, it is very easy to cause the stator assembly encapsulated in the housing after potting to have poor stability and uneven surface due to reasons such as non-standard glue coating method and difficulty in controlling dimensional accuracy. After assembling the rotor assembly, the motor has problems of poor coaxiality, an unbalanced magnetic circuit, large rotating eccentricity, and friction.

Therefore, based on the problems existing in the prior art, it is necessary to develop a potting method and a potting tooling for a coreless motor, so as to improve the stability and surface flatness of a stator assembly encapsulated in a housing after potting.

SUMMARY OF THE INVENTION

In view of this, the present disclosure provides a potting method of a coreless motor including a stator assembly, a rotor assembly, and a housing, the stator assembly is provided within the housing and is provided with a cavity extending in the axial direction therethrough, the rotor assembly is rotatably provided through the cavity, characterized in that it includes the steps of:

a. Providing the stator assembly and the housing, sleeving the housing on an outer wall of the stator assembly, and controlling two ends of the housing to extend in the axial direction out of two ends of the stator assembly;

b. Providing potting tooling, wherein the potting tooling includes a potting fixture, the potting fixture includes a first potting fixture, the first potting fixture includes a first potting head and a first potting shaft, and the first potting head and the first potting shaft are sequentially provided in an axial direction; the potting fixture includes a second potting fixture, the second potting fixture includes a second potting and a second potting shaft, and the second potting head and the second potting shaft are sequentially provided in an axial direction;

c. Inserting the first potting fixture and the second potting fixture into one end and the other end of the housing respectively in an axial direction, so that the first potting head and the second potting head abut against the housing and are respectively provided at intervals from one end face and the other end face of the stator group, so that the first potting shaft and the second potting shaft are inserted into the cavity and provided at an interval from the inner wall of the stator assembly;

d. Controlling an end of the first potting shaft and an end face of the second potting shaft to abut against each other; the potting fixture forms a potting space between two end faces of the stator assembly and an inner wall of the stator assembly; and e. Injecting glue into the potting space via a first potting head and a second potting head to form an encapsulation layer to encapsulate the stator assembly on the inner wall of the housing.

Optionally, the first potting head includes a first step portion I and a first step portion II, the first step portion I and the first step portion II are sequentially provided in an axial direction, an outer diameter of the first step portion I is greater than an outer diameter of the first step portion II; in step c, after the first potting fixture is inserted into one end of the housing in the axial direction, the inner end face of the first step portion I abuts against one end face of the housing, the outer wall of the first step portion II abuts against the inner wall of the housing to block one end of the housing, and the inner end face of the first step portion II is provided at intervals from the one end face of the stator assembly to form a first gap, and the outer wall of the first potting shaft is provided at intervals from the inner wall of the stator assembly to form a second gap.

Optionally, the second potting head includes a second step portion I and a second step portion II, the second step portion I and the second step portion II are sequentially provided in an axial direction, the outer diameter of the second step portion I is greater than the outer diameter of the second step portion II; in step c, after the second potting fixture is inserted into the other end of the housing in the axial direction, the inner end face of the second step portion I abuts against the other end face of the housing, the outer wall of the second step portion II abuts against the inner wall of the housing to block the other end of the housing, and the inner end face of the second step portion II is provided at intervals from the other end face of the stator assembly to form a third gap, and the outer wall of the first potting shaft is provided at intervals from the inner wall of the stator assembly to form a fourth gap.

Optionally, before inserting the potting fixture into two ends of the housing, the outer wall of the first potting shaft and the outer wall of the second potting shaft are respectively coated with a first membrane and a second membrane, and in step e, after the glue is poured into the potting space, the first membrane and the second membrane are fixed on the inner wall of the stator assembly by the glue.

Optionally, the first potting head is provided with first pouring holes, the first pouring holes extend from an outer end face of the first step portion I in an axial direction to an inner end face of the first step portion II, in step c, the first potting fixture is inserted in the axial direction to block one end of the housing, the first gap and the second gap are in communication with a space outside the housing via the first pouring holes, and a lead-out extending from one end face of the stator assembly passes through the first pouring holes and then extends out of the first potting head; in the step e, glue is injected into the first gap and the second gap via the first pouring holes.

Optionally, the first pouring holes are provided with the first pouring openings on the outer wall of the first step portion II, the first pouring openings extending from the inner end face of the first step portion I to the inner end face of the first step portion II. After the first potting fixture is inserted into one end of the housing in the axial direction, the outer wall of the first step portion II abuts against the inner wall of the housing, and the first pouring openings open towards the inner wall of the housing. In step e, the glue injected from the first pouring holes can contact the inner wall of the housing via the first pouring openings, flow out of the first pouring holes along the inner wall of the housing, and inject into the first gap, namely, the glue flowing out of the first pouring holes can flow into the first gap from the position in the first gap closest to the inner wall of the housing, and gradually fill the first gap radially inward, avoiding a dead angle in the first gap near the side of the inner wall of the housing which is not filled with the glue.

Optionally, the first potting head includes a first groove extending in the axial direction from an outer end face of the first step portion I toward an inner end face of the first step portion I. The first pouring holes are provided with glue overflow openings on an inner wall of the first groove, and the glue overflow openings extend from an outer end face of the first step portion I to an end face of the first groove. The glue overflow openings facilitate the lead wires to extend out of the first potting head. Since lead wires are provided through the first pouring holes when the glue is injected from the first pouring holes into the pouring and sealing space, the glue easily overflows the first pouring holes, and the arrangement of the first groove provides an accommodating space for the glue overflowing from the outside of the first pouring holes, so as to collect the overflowing glue and avoid further overflowing the glue to a position outside the first potting head, such as an outer wall of the housing, thereby causing pollution, and optimizing the technical output.

Optionally, the second potting head is provided with second pouring holes, and the second pouring holes extend from an outer end face of the second step portion I in an axial direction to an inner end face of the second step portion II, and in step c, the second potting fixture is inserted in the axial direction to block the other end of the housing, and the third gap and the fourth gap are in communication with a space outside the housing via the second pouring holes; in the step e, glue is injected into the third gap and the fourth gap via the second pouring holes.

Optionally, the second pouring holes are provided with second pouring openings on the outer wall of the second step portion II, the second pouring openings extending from the inner end face of the second step portion I to the inner end face of the second step portion II. After the second potting fixture is inserted into the other end of the housing in the axial direction, the outer wall of the second step portion II abuts against the inner wall of the housing, and the second pouring openings open towards the inner wall of the housing. In step e, the glue injected from the second pouring holes can contact the inner wall of the housing via the second pouring openings, flow out of the second pouring holes along the inner wall of the housing, and inject into the third gap, namely, the glue flowing out of the second pouring holes can flow into the third gap from the position in the third gap closest to the inner wall of the housing, and gradually fill the third gap radially inward, so as to avoid angle in the third gap near the side of the inner wall of the housing which is not filled with glue.

Based on the same inventive concept, the present application also provides potting tooling for the above-mentioned potting method of a coreless motor, wherein the potting tooling includes a potting fixture, the potting fixture includes a potting head and a potting shaft, and the potting head and the potting shaft are sequentially provided in an axial direction; the potting head is adapted to abut against the housing of the coreless motor and is provided at intervals from the end face of the stator assembly of the coreless motor; the potting shaft is adapted to be inserted into the cavity of the coreless motor stator assembly when the potting head abuts against the coreless motor housing, and is provided at intervals from the inner wall of the coreless motor stator assembly; the potting head, the potting shaft, an inner wall of the coreless motor stator assembly and an end face of the coreless motor stator assembly form a potting space therebetween.

Optionally, the potting head includes a step portion I and a step portion II, the step portion I and the step portion II are sequentially provided in an axial direction, the outer diameter of the step portion I is greater than the outer diameter of the step portion II; when the potting shaft is provided within the cavity of the coreless motor stator assembly, the inner end face of the step portion I is adapted to abut against the end face of the housing of the coreless motor, the outer wall of the step portion II is adapted to abut against the inner wall of the housing of the coreless motor such that the inner end face of the second of the steps is provided at intervals from the end face of the coreless motor stator assembly, and the outer wall of the potting shaft is provided at intervals from the inner wall of the coreless motor stator assembly.

Optionally, the distance between the inner end face of the step portion II and the end face of the coreless motor stator assembly, i.e. the length L1 in the axial direction, is 0.3 mm-0.5 mm; the distance between the outer wall of the potting shaft and the inner wall of the coreless motor stator assembly, i.e. the width in the radial direction, is between 0.02 mm and 0.05 mm.

Optionally, the length L2 of the step portion I in the axial direction is between 8% and 10% of the length of the potting fixture in the axial direction.

Optionally, the potting head is provided with pouring holes; the pouring holes extend in the axial direction from an outer end face of the step portion I to an inner end face of the step portion II to communicate the pouring space with a space outside the coreless motor when the potting head abuts against the housing of the coreless motor.

Optionally, the pouring holes are provided with pouring openings on the outer wall of the step portion II, in which the pouring openings extend from the inner end face of the step portion I to the inner end face of the step portion II.

Alternatively, the pouring holes are fan-ring shaped in radial cross-section.

Alternatively, the fan-ring outer diameter of the pouring holes is the same as the inner diameter of the coreless motor housing.

Optionally, the fan-ring central angle of the pouring holes is 20°-30°.

Optionally, the pouring holes have a fan-ring outer diameter and a fan-ring inner diameter that differ by 0.3 mm to 0.7 mm.

Optionally, the potting head includes a first groove extending in an axial direction from an outer end face of the step portion I toward an inner end face of the step portion I; the pouring holes are provided with glue overflow openings on an inner wall of the first groove, and the glue overflow openings extend from an outer end face of the step portion I to an end face of the first groove.

Alternatively, the inner diameter of the first groove is the same as the fan-ring inner diameter of the pouring holes.

Optionally, the potting head further includes a second groove extending in an axial direction from the end face of the first groove towards the inner end face of the step portion II, the inner diameter of the second groove is smaller than the inner diameter of the first groove.

Alternatively, the difference between the inner diameter of the first groove and the inner diameter of the second groove is 0.8 mm-1.2 mm.

Alternatively, the length L4 of the first groove in the axial direction is 0.8 mm to 1.2 mm and the length L5 of the second groove in the axial direction is 0.8 mm to 1.2 mm.

Based on the same inventive concept, the present application also provides a coreless motor manufactured by the above-mentioned coreless motor potting method, the coreless motor includes a stator assembly, a rotor assembly, and a housing, wherein the stator assembly is provided in the housing and is provided with a cavity extending in an axial direction, and the rotor assembly is rotatably provided through the cavity, characterized in that two ends of the housing are adapted to extend in the axial direction out of two ends of the stator assembly, and the coreless motor further includes an encapsulation layer adapted to encapsulate the stator assembly on an inner wall of the housing.

Compared with the prior art, the technical solution of the embodiment of the present disclosure has an advantageous effect.

For example, according to the potting method of the coreless motor of the present disclosure, the stator assembly of the coreless motor is fixed in the housing via potting tooling, so as to improve the stability of the stator assembly during the potting process; and a standard potting space is formed by inserting the potting tooling, and glue is poured into the standard potting space to form an encapsulation layer to encapsulate the stator assembly. The encapsulation layer has a uniform thickness and a flat surface under the constraint of the potting tooling, and the structure of the potting stator assembly is symmetrical in the housing, so as to avoid the problem of an unbalanced magnetic circuit caused by an asymmetrical structure; the encapsulation layer completely covers the stator assembly under the constraint of the potting tooling, ensuring that the stator assembly is completely encapsulated in the housing, the potting stator assembly is more firm and stable, which greatly improves the production yield of the coreless motor.

As another example, by wrapping a membrane on the potting shaft of the potting tooling, the membrane is placed between the potting shaft and the inner wall of the stator assembly during the potting process by inserting the potting shaft into the cavity of the stator assembly. After the glue is injected into the potting space, the membrane is adhered to the inner wall of the stator assembly, further improving the flatness of the encapsulation layer on the inner wall of the stator assembly, avoiding burrs, and effectively eliminating friction between the rotor assembly and the stator assembly when the rotor assembly is assembled in the cavity and rotating.

For another example, a groove is provided on the potting head, so as to provide an accommodating space for the glue overflowing from inside and outside the pouring holes provided with lead wires during the process of pouring the glue, so as to collect the overflowing glue and avoid further overflowing to a position outside the potting head, such as an outer wall of the housing, thereby causing pollution, and optimizing the process output.

DETAILED DESCRIPTION OF THE INVENTION

Figure 1:
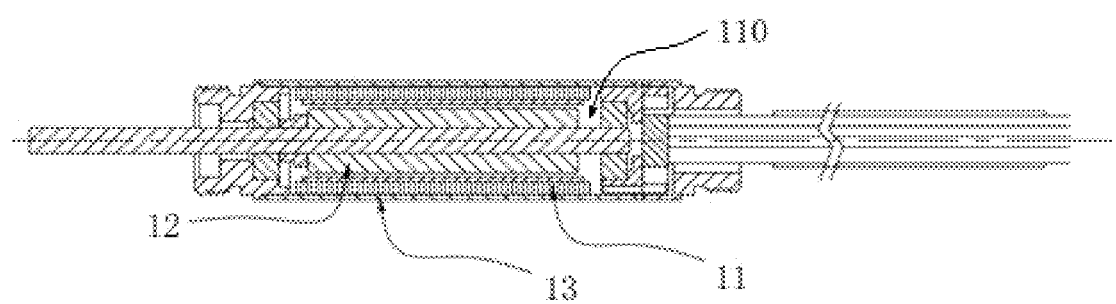
FIG. 1 is a sectional view showing a structure of a coreless motor in an embodiment of the present disclosure.
Figure 2:
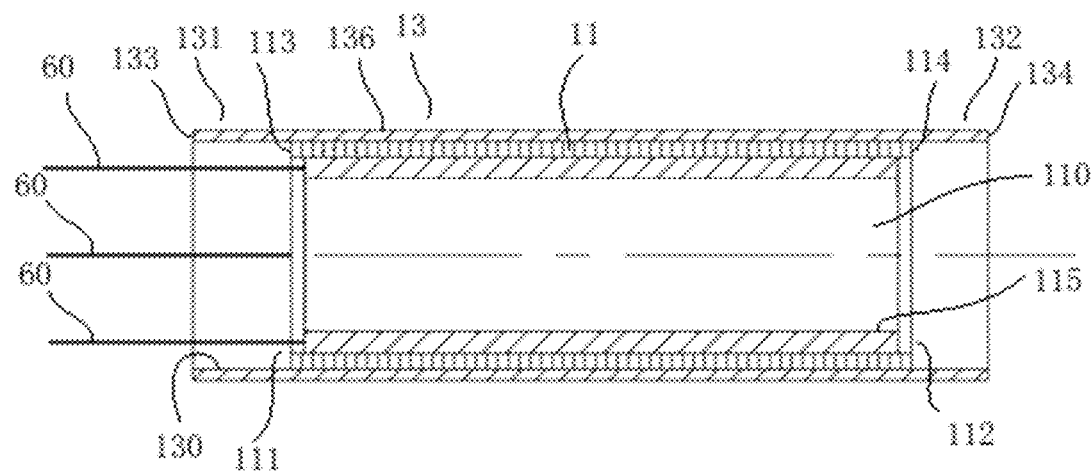
FIG. 2 is a cross-sectional view of the coreless motor stator assembly of an embodiment of the present disclosure prior to potting.
Figure 3:
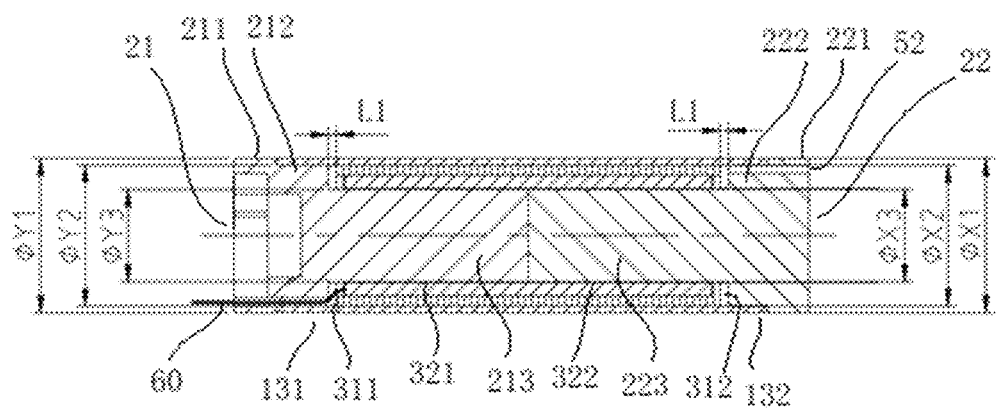
FIG. 3 is a schematic view of a coreless motor potting process according to an embodiment of the present disclosure.
Figure 4:
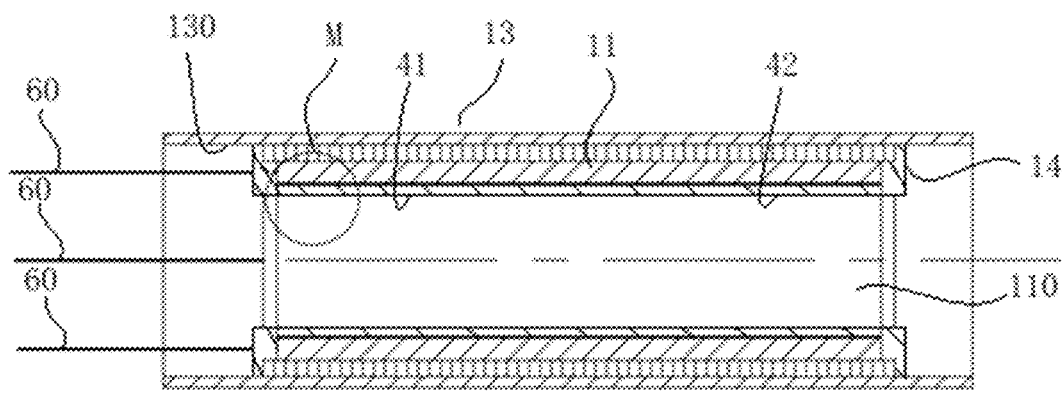
FIG. 4 is a schematic view showing a structure after potting the coreless motor in the embodiment of the present disclosure.
Figure 5:
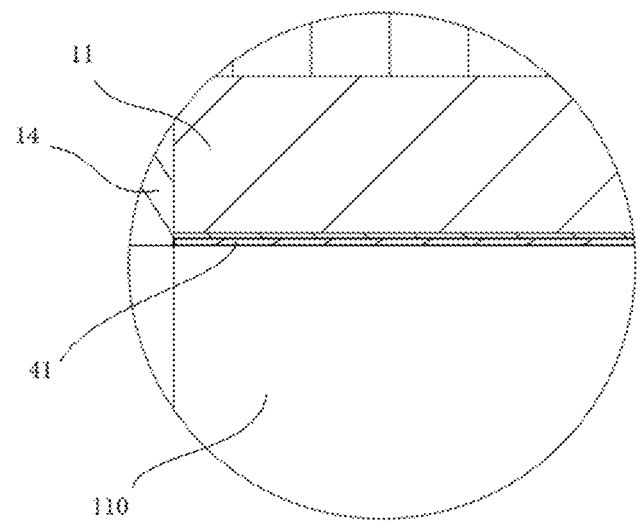
FIG. 5 is an enlarged structural view at M in FIG. 4.

In order that the objects, features, and advantages of the invention may be more readily understood, a detailed description of specific embodiments of the invention will be set forth below in connection with the accompanying drawings. It is to be understood that the specific embodiments described below are merely illustrative of the invention and are not restrictive. Also, the same or similar reference numerals may be used in the drawings to refer to the same or similar elements in different embodiments, descriptions of the same or similar elements in different embodiments and descriptions of prior art elements, features, effects, etc. may be omitted.

As shown in this specification and claims, unless otherwise indicated or apparent from the context, all numerical values provided herein are modified by the term "about", which is understood to be within normal tolerances in the art. "about" is understood to mean that the stated value allows for a tolerance of 10%, 9%, 8%, 7%, 6%, 5%, 4%, 3%, 2%, 1%, 0.5%, 0.1%, 0.05% or 0.01%, etc. of its value.

Referring to FIG. 1, the coreless motor includes a stator assembly 11, a rotor assembly 12, and a housing 13, wherein the stator assembly 11 is provided in the housing 13 and is provided with a cavity 110 penetrating in an axial direction, and the rotor assembly 12 is rotatably provided through the cavity 110.

Referring to FIGS. 2 to 11, an embodiment of the present disclosure provides a potting method of a coreless motor.

In particular, the potting method includes the steps of:

a. Providing a stator assembly 11 and a housing 13, sleeving the housing 13 on an outer wall of the stator assembly 11, and controlling two ends of the housing 13 to extend out of two ends of the stator assembly 11 in an axial direction; specifically, one end 131 of the control housing 13 extends in the axial direction out of one end 111 of the stator assembly 11, and the other end 132 of the control housing 13 extends in the axial direction out of the other end 112 of the stator assembly 11;

b. Providing potting tooling, wherein the potting tooling includes a potting fixture, the potting fixture includes a first potting fixture 21, the first potting fixture 21 includes a first potting head 210 and a first potting shaft 213, and the first potting head 210 and the first potting shaft 213 are sequentially provided in an axial direction; the potting fixture includes a second potting fixture 22; the second potting fixture 22 includes a second potting head 220 and a second potting shaft 223, wherein the second potting head 220 and the second potting shaft 223 are sequentially provided in an axial direction;

c. Inserting the first potting fixture 21 into one end 131 of the housing 13 in an axial direction, so that the first potting head 210 abuts against the housing 13 and is provided at intervals from one end face 113 of the stator assembly 11, so that the first potting shaft 213 is inserted into the cavity 110 and is provided at intervals from the inner wall 115 of the stator assembly 11; inserting the second potting fixture 22 into the other end 132 of the housing 13 in an axial direction, so that the second potting head 220 abuts against the housing 13 and is provided at intervals from the other end face 114 of the stator assembly 11, so that the second potting shaft 223 is inserted into the cavity 110 and is provided at intervals from the inner wall 115 of the stator assembly 11; in this step, the order of inserting the first potting fixture 21 and the second potting fixture 22 is: either first inserting the first potting fixture 21 into one end 131 of the housing 13 and then inserting the second potting fixture 22 into the other end 132 of the housing 13 in the axial direction, or first inserting the second potting fixture 22 into the other end 132 of the housing 13 and then inserting the first potting fixture 21 into one end 131 of the housing 13 in the axial direction, or simultaneously inserting the first potting fixture 21 and the second potting fixture 22 into one end 131 and the other end 132 of the housing 13 in the axial direction;

d. Controlling the end face 2131 of the first potting shaft 213 and the end face 2231 of the second potting shaft 223 to abut against each other; the potting fixture forms a potting space between the two end faces of the stator assembly 11 and the inner wall 115 of the stator assembly 11; and e. Injecting glue into the potting space via the first potting head 210 and the second potting head 220 to form the encapsulation layer 14 so as to encapsulate the stator assembly 11 on the inner wall 130 of the housing 13.

In some embodiments, the first potting head 210 includes a first step portion I 211 and a first step portion II 212, wherein the first step portion I 211 and the first step portion II 212 are sequentially provided in an axial direction, and the outer diameter $\Phi Y1$ of the first step portion I 211 is greater than the outer diameter $\Phi Y1$ of the first step portion II 212; in step c, after the first potting fixture 21 is inserted into one end 131 of the housing 13 in the axial direction, the inner end face 2111 of the first step portion I 211 abuts against the one end face 133 of the housing 13, the outer wall 2121 of the first step portion II 212 abuts against the inner wall 130 of the housing 13 to block the one end 131 of the housing 13, the inner end face 2122 of the first step portion II 212 is provided at intervals from the one end face 113 of the stator assembly 11 to form a first gap 311, the outer wall 2132 of the first potting shaft 213 is provided at intervals from the inner wall 115 of the stator assembly 11 to form a second gap 321, and the first gap 311 is in communication with the second gap 321.

In some embodiments, the second potting head 220 includes a second step portion I 221 and a second step portion II 222, wherein the second step portion I 221 and the second step portion II 222 are sequentially provided in an axial direction, the outer diameter $\Phi X1$ of the second step portion I 221 is greater than the outer diameter $\Phi X2$ of the second step portion II 222; in step c, after the second potting fixture 22 is inserted into the other end 132 of the housing 13 in the axial direction, the inner end face 2211 of the second step portion I 221 abuts against the other end face 134 of the housing 13, the outer wall 2221 of the second step portion II 222 abuts against the inner wall 130 of the housing 13 to block the other end 132 of the housing 13, the inner end face 2222 of the second step portion II 222 is provided at intervals from the other end face 114 of the stator assembly 11 to form a third gap 312, the outer wall 2232 of the second potting shaft 223 is provided at intervals from the inner wall 115 of the stator assembly 11 to form a fourth gap 322, and the third gap 312 is in communication with the fourth gap 322.

In particular embodiments, the second gap 321 is in communication with the fourth gap 322; the first gap 311, the second gap 321, the third gap 312 and the fourth gap 322 form a potting space. In some embodiments, the first membrane 41 and the second membrane 42 are respectively coated on the outer wall 2132 of the first potting shaft 213 and the outer wall 2232 of the second potting shaft 223 before the potting fixture is inserted into two ends of the housing 13. In step e, after the glue is poured into the potting space, the first membrane 41 and the second membrane 42 are fixed on the inner wall 115 of the stator assembly 11 by the glue.

After the glue is poured and cured, the potting fixture is removed, there is a risk that the outer wall 2132 of the first potting shaft 213 and the outer wall 2232 of the second potting shaft 223 will stick to the glue, resulting in burrs on the surface of the encapsulation layer 14.

In particular embodiments, the potting fixture may be made of a material that has no adhesion with the glue, such as Teflon, so as to ensure that after the glue is poured into the potting space and cured, the potting fixture is smoothly separated from the cured glue, and there is no adhesion between the two, thereby ensuring that the encapsulation layer 14 formed after the glue is cured is flat and smooth.

Furthermore, the first membrane 41 and the second membrane 42 are coated on the outer wall 2132 of the first potting shaft 213 and the outer wall 2232 of the second potting shaft 223, so that the first membrane 41 and the second membrane 42 are closely matched with the outer wall 2132 of the first potting shaft 213 and the outer wall 2232 of the second potting shaft 223 respectively, so as to ensure that when the glue is poured into the potting space, the glue only flows into between the first membrane 41, the second membrane 42 and the inner wall 130 of the housing 13; without being in direct contact with the outer wall 2132 of the first potting shaft 213 and the outer wall 2232 of the second potting shaft 223, i.e. by forming a partition between the outer wall 2132 of the first potting shaft 213 and the glue and between the outer wall 2232 of the second potting shaft 223 and the glue by the first membrane 41, the second membrane 42, respectively. On the one hand, the first membrane 41 and the second membrane 42 completely eliminate the direct contact between the potting fixture and the glue, so as to avoid the phenomenon that a burr is generated on the surface of the encapsulation layer 14 due to the glue adhering during the process of removing the potting fixture; on the other hand, the first membrane 41 and the second membrane 42 adhere to the surface of the cured glue of the encapsulation layer 14, further improving the flatness of the encapsulation layer 14, effectively eliminating friction with the stator assembly 11 when the rotor assembly 12 is assembled in the cavity 110 for rotation.

In some embodiments, the first potting head 210 is provided with first pouring holes 51, the first pouring holes 51 extend in the axial direction from an outer end face 2112 of the first step portion I 211 to an inner end face 2122 of the first step portion II 212, in step c, the first potting fixture 21 is inserted in the axial direction to block an end 131 of the housing 13, the first gap 311 and the second gap 321 are in communication with a space outside the housing 13 through the first pouring holes 51, and the lead wires 60 extending from an end face 113 of the stator assembly 11 pass through the first pouring holes 51 and then extend out of the first potting head 210; in step e, glue is injected into the first gap 311 and the second gap 321 via the first pouring holes 51.

In a specific embodiment, the number of the first pouring holes 51, and the circumferential distribution of the first potting heads 210, may be determined according to the number and arrangement of the lead wires 60 of the stator assembly 11. For example, for a stator assembly of a brushless direct current motor, the lead wires 60 are three and uniformly distributed in the circumferential direction, and therefore, the number of the first pouring holes 51 is three and uniformly distributed in the circumferential direction, when the first potting head 210 is inserted to one end 131 of the housing 13, the first pouring holes 51 are aligned with the lead wires 60 so that the lead wires 60 extend out of the first potting head 210 after passing through the first pouring holes 51, and the lead wires 60 are prevented from being encapsulated in the housing 13 by glue in step e. The dimension of the first pouring holes 51 in radial cross-section needs to be greater than the line width of the lead wires 60 to ensure that when the lead wires 60 penetrate the first pouring holes 51 and the glue is injected into the potting space via the first pouring holes 51, there is still a gap in the first pouring holes 51 for the glue to flow in.

In some embodiments, the first pouring holes 51 are provided with first pouring openings 511 on the outer wall 2121 of the first step portion II 212, the first pouring openings 511 extending from the inner end face 2111 of the first step portion I 211 to the inner end face 2122 of the first step portion II 212. After the first potting fixture 21 is inserted into one end 131 of the housing 13 in the axial direction, the outer wall 2121 of the first step portion II 212 abuts against the inner wall 130 of the housing 13, and the first pouring openings 511 opens toward the inner wall 130 of the housing 13. In step e, the glue injected from the first pouring holes 51 can contact the inner wall 130 of the housing 13 via the first pouring openings 511, flow out of the first pouring holes 51 along the inner wall 130 of the housing 13, and inject into the first gap 311, that is, the glue flowing out of the first pouring holes 51 can flow into the first gap 311 from the position in the first gap 311 closest to the inner wall 130 of the housing 13 and gradually fill the first gap 311 radially inward, avoiding a dead angle in the first gap 311 near the side of the inner wall 130 of the housing 13 which is not filled with glue.

In some embodiments, the first potting head 210 includes a first groove 214 extending in an axial direction from the outer end face 2112 of the first step portion I 211 toward the inner end face 2111 of the first step portion I 211. The first pouring holes 51 are provided with glue overflow openings 512 on the inner wall 2141 of the first groove 214, the glue overflow openings 512 extending from the outer end face 2112 of the first step portion I 211 to the end face 2142 of the first groove 214. The glue overflow openings 512 facilitate the extension of the lead wires 60 out of the first potting head 210. Since the lead wires 60 are provided through the first pouring holes 51 when the glue is injected from the first pouring holes 51 into the pouring and sealing space, the glue easily overflows the first pouring holes 51, and the provision of the first groove 214 provides an accommodating space for the glue overflowing from the first pouring holes 51 to collect the overflowing glue so as to avoid further overflowing the glue to a position outside the first potting head 210, such as the outer wall 136 of the housing 13, thereby causing pollution and optimizing the process output.

In a particular embodiment, the inner diameter $\Phi M$ of the first groove 214 is the same as the inner diameter $\Phi Q2$ of the first pouring holes 51. Thus, the design is achieved in that the first pouring holes 51 open glue overflow openings 512 on the inner wall 2141 of the first groove 214. In order for the first pouring holes 51 to provide an axial pouring stroke H for the glue to ensure that the glue has sufficient pouring pressure and an accurate pouring guide to flow into the first gap 311 and the second gap 321, the length of the first groove 214 in the axial direction is smaller than the length of the first step portion I 211 in the axial direction.

In some embodiments, due to the limited extension length of the first groove 214 in the axial direction, a second groove 215 may be further opened, the second groove 215 extending from the end face 2142 of the first groove 214 in the axial direction towards the inner end face 2122 of the first step portion II 212 to increase the collection space for the glue overflowing from outside the first pouring holes 51. Meanwhile, in order to avoid the filling stroke H of the first pouring holes 51, the inner diameter $\Phi N$ of the second groove 215 is smaller than the inner diameter $\Phi M$ of the first groove 214.

In some embodiments, when the inner diameter $\Phi N$ of the second groove 215 is smaller than the outer diameter $\Phi Y3$ of the first potting shaft 213, the sum of the extension length in the axial direction of the second groove 215 and the first groove 214 is smaller than the sum of the extension length in the axial direction of the first potting head 210 and the first potting shaft 213, so that the second groove 215 does not penetrate the first potting shaft 213 in the axial direction, ensuring the blocking of the housing 13 by the first potting fixture 21 to form the first gap 311 and the second gap 321.

In other specific embodiments, when the inner diameter ΦN of the second groove 215 is greater than the outer diameter ΦY3 of the first potting shaft 213, the sum of the extension length in the axial direction of the second groove 215 and the first groove 214 is less than the extension length L in the axial direction of the first potting head 210, so that the second groove 215 does not extend through the first potting head 210 in the axial direction, ensuring the blocking of the housing 13 by the first potting fixture 21 to form the first gap 311 and the second gap 321.

In some embodiments, the second potting head 220 is provided with second pouring holes 52, and the second pouring holes 52 extend from an outer end face 2212 of the second step portion I 221 to an inner end face 2222 of the second step portion II 222 in an axial direction, and in step c, the second potting fixture 22 is inserted in the axial direction to block the other end 132 of the housing 13, and the third gap 312 and the fourth gap 322 are in communication with the space outside the housing 13 via the second pouring holes 52; in step e, glue is injected into the third gap 312 and the fourth gap 322 via the second pouring holes 52.

In particular embodiments, the second potting head 220 is provided with at least one second pouring hole 52. When glue is injected from the other end 132 of the housing 13 through the second pouring holes 52, there is a risk that glue cannot flow through the entire space of the third gap 312, the fourth gap 322. Furthermore, in order to improve the potting effect of the third gap 312 and the fourth gap 322, two or more second pouring holes 52 are provided in the second potting head 220. In this embodiment, the number of the second pouring holes 52 is two and is uniformly distributed along the circumference of the second potting head 220. Compared with the glue injected from only one second pouring holes 52, the glue injected from two oppositely provided second pouring holes 52 into the third gap 312 and the fourth gap 322 at the same time, respectively, reduces the flow distance by half, namely, in the same curing time, the area required to be filled by the glue injected from the two second pouring holes 52 respectively is reduced, effectively avoiding the situation that the glue does not fill the third gap 312 and the entire space of the fourth gap 322 is cured first, ensuring that the third gap 312 and the fourth gap 322 are fully filled with the glue.

In some embodiments, the second pouring holes 52 are provided with second pouring openings 521 on the outer wall 2221 of the second step portion II 222, the second pouring openings 521 extending from the inner end face 2211 of the second step portion I 221 to the inner end face 2222 of the second step portion II 222. After the second potting fixture 22 is inserted into the other end 132 of the housing 13 in the axial direction, the outer wall 2221 of the second step portion II 222 abuts against the inner wall 130 of the housing 13, and the second pouring openings 521 opens toward the inner wall 130 of the housing 13. In step e, the glue injected from the second pouring holes 52 can contact the inner wall 130 of the housing 13 via the second pouring openings 521, flow out of the second pouring holes 52 along the inner wall 130 of the housing 13, and inject into the third gap 312, that is, the glue flowing out of the second pouring holes 52 can flow into the third gap 312 from the position in the third gap 312 closest to the inner wall 130 of the housing 13 and gradually fill the third gap 312 radially inward, avoiding a dead angle in the third gap 312 near the side of the inner wall 130 of the housing 13 which is not filled with glue.

In particular embodiments, the outer diameter ΦY2 of the first step portion II 212 and the outer diameter ΦX2 of the second step portion II 222 are equal to the inner diameter of the housing 13, such that when the first step portion I 211 and the second step portion I 221 abut one end face 133 and the other end face 134 of the housing 13, respectively, the first step portion II 212 and the second step portion II 222 abut against the inner wall 130 of the housing 13, thereby securing the potting fixture to the housing 13. The first step portion II 212 and the second step portion II 222 can both be connected to the housing 13 by means of a clearance fit.

Figure 7:
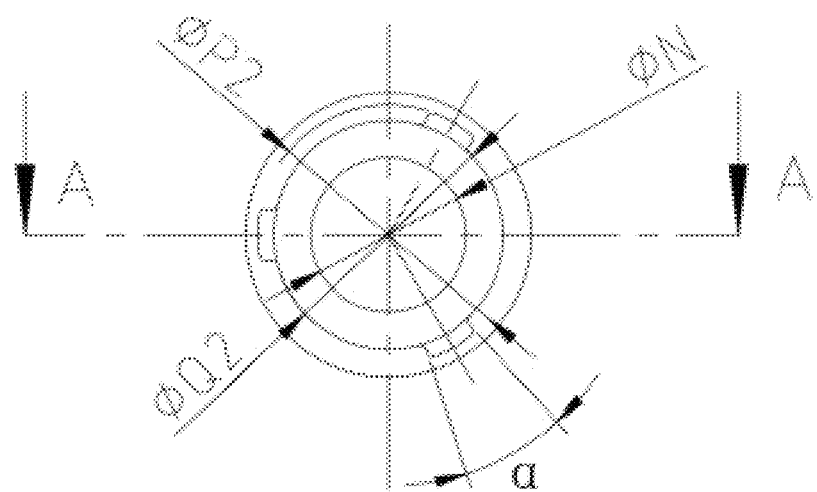
FIG. 7 is a top view of the structure shown in FIG. 6.
Figure 10:
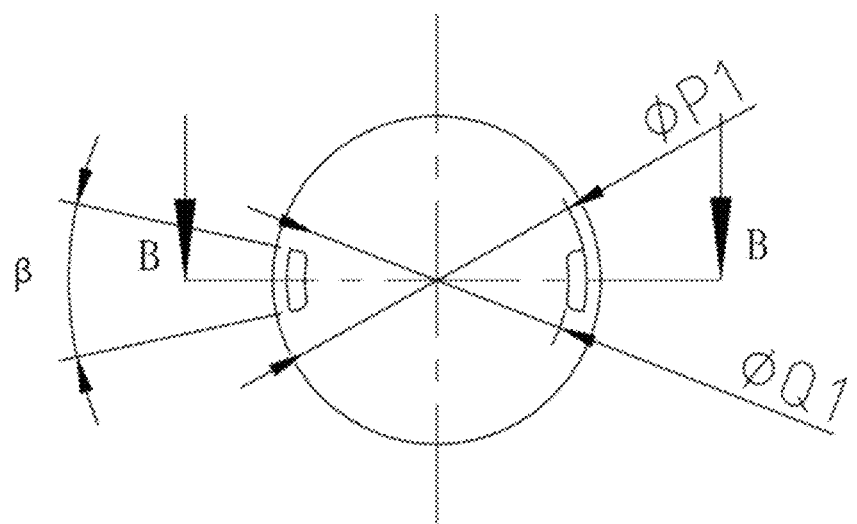
FIG. 10 is a top view of the structure shown in FIG. 9.

Referring to FIGS. 7 and 10, the first pouring holes 51 and the second pouring holes 52 are fan-ring shaped in radial cross-section. Taking the first pouring holes 51 as an example, the fan-ring outer diameter ΦP2 of the first pouring holes 51 is the same as the inner diameter of the housing 13, so as to ensure that the glue does not flow to the end face 133 of the housing 13 via the first pouring holes 51, but flows directly into the first gap 311 along the inner wall 130 of the housing 13, shortening the distance (i.e. the pouring stroke H) through which the glue flows before entering the first gap 311, thereby reducing the risk of the glue solidifying before not filling the first gap 311 and the second gap 321. Furthermore, the fan-ring outer diameter ΦP2 of the first pouring holes 51 is the same as the inner diameter of the housing 13, namely, the fan-ring outer diameter ΦP2 of the first pouring holes 51 is in the same shape as the outer diameter ΦY2 of the first step portion II 212, thereby realizing the design that the first pouring holes 51 open first pouring openings 511 on the outer wall 2121 of the first step portion II 212. The fan-ring central angle α of the first pouring holes 51 is 20°-30°, and the difference between the fan-ring outer diameter ΦP2 of the first pouring holes 51 and the fan-ring inner diameter ΦQ2 of the first pouring holes 51 is 0.25 mm, so as to meet the requirements for glue injection. Taking the second pouring holes 52 as an example, the fan-ring outer diameter ΦP1 of the second pouring holes 52 is the same as the inner diameter of the housing 13, in order to ensure that the glue does not flow via the second pouring holes 52 to the end face 134 of the housing 13, but flows directly into the third gap 312 along the inner wall 130 of the housing 13, shortening the distance (i.e. pouring stroke H) through which the glue flows before entering the third gap 312, thereby reducing the risk of the glue solidifying before not filling the third gap 312 and the fourth gap 322. Furthermore, the fan-ring outer diameter ΦP1 of the second pouring holes 52 is the same as the inner diameter of the housing 13, namely, the fan-ring outer diameter ΦP1 of the second pouring holes 52 is in the same shape as the outer diameter ΦX2 of the second step portion II 222, thereby realizing the design that the second pouring holes 52 open second pouring openings 521 on the outer wall 2221 of the second step portion II 222. The fan-ring central angle β of the second pouring holes 52 is 20°-30°, and the difference between the fan-ring outer diameter ΦP1 of the second pouring holes 52 and the fan-ring inner diameter ΦQ1 of the second pouring holes 52 is 0.25 mm, so as to meet the requirements for glue injection.

Based on the same inventive concept, embodiments of the present disclosure also provide a potting tooling for the coreless motor potting method described above.

Referring to FIGS. 6 to 11, the potting tooling includes a potting fixture.

Figure 6:
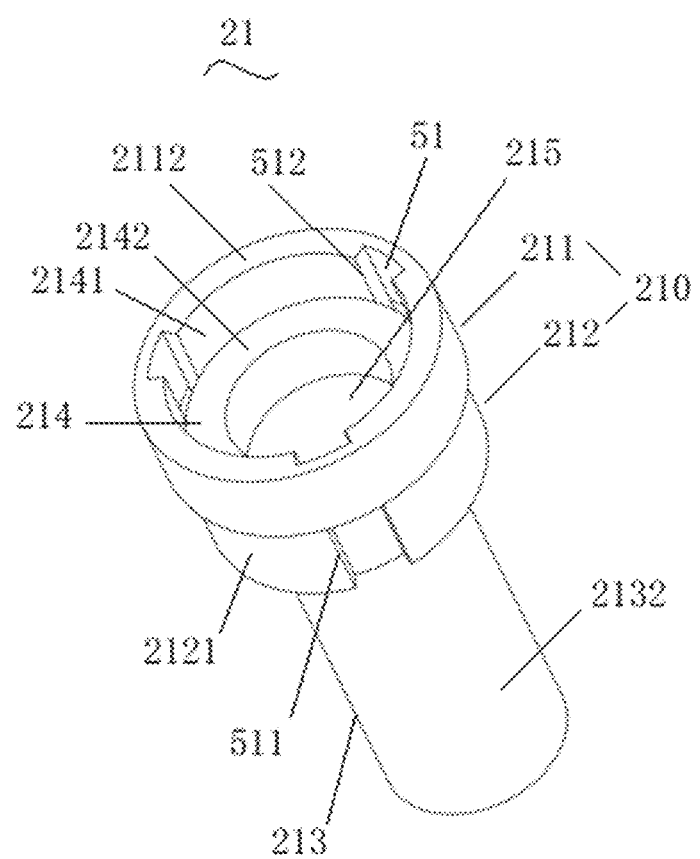
FIG. 6 is a schematic view of a first potting fixture in accordance with an embodiment of the present disclosure.
Figure 8:
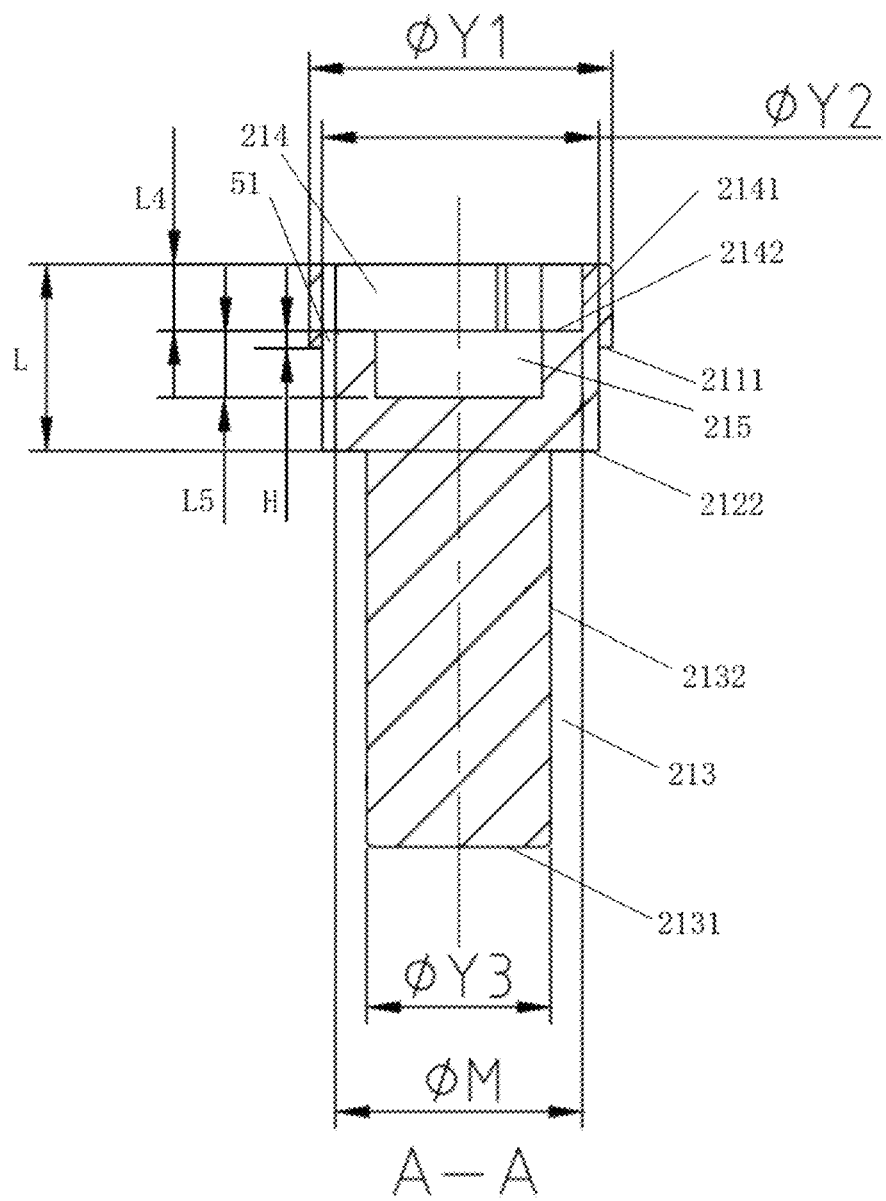
FIG. 8 is a sectional view A-A of the structure shown in FIG. 7.

Referring to FIGS. 6 to 8, one embodiment of a potting fixture is a first potting fixture 21. The first potting fixture 21 includes a first potting head 210 and a first potting shaft 213, wherein the first potting head 210 and the first potting shaft 213 are sequentially provided in an axial direction; the first potting head 210 is adapted to abut against the housing 13 of the hollow cup electric motor and is provided at intervals from the end face 113 of the coreless motor stator assembly 11; the first potting shaft 213 is adapted to be inserted into the cavity 110 of the coreless motor stator assembly 11 when the first potting head 210 abuts against the coreless motor housing 13, and is provided at intervals from the inner wall 115 of the coreless motor stator assembly 11; a first gap 311 is formed between the first potting head 210 and the end face 113 of the coreless motor stator assembly 11, a second gap 321 is formed between the first potting shaft 213 and the inner wall 115 of the coreless motor stator assembly 11, and the first gap 311 is in communication with the second gap 321.

In some embodiments, the first potting head 210 includes a first step portion I 211 and a first step portion II 212, wherein the first step portion I 211 and the first step portion II 212 are sequentially provided in an axial direction, and the outer diameter ΦY1 of the first step portion I 211 is greater than the outer diameter ΦY2 of the first step portion II 212; when the first potting shaft 213 is placed in the cavity 110 of the coreless motor stator assembly 11, the inner end face 2111 of the first step portion I 211 is adapted to abut against the end face 133 of the housing 13 of the coreless motor, and the outer wall 2121 of the first step portion II 212 is adapted to abut against the inner wall 130 of the coreless motor housing 13, so that the inner end face 2122 of the first step portion II 212 is provided at intervals from the end face 113 of the coreless motor stator assembly 11 to form a first gap 311; the outer wall 2132 of the first potting shaft 213 is provided at intervals from the inner wall 115 of the coreless motor stator assembly 11 to form a second gap 321. In particular embodiments, the outer diameter ΦY2 of the first step portion II 212 is the same as the inner diameter of the coreless motor housing 13, and the outer diameter ΦY3 of the first potting shaft 213 is less than the inner diameter of the stator assembly 11.

In some embodiments, the distance between the inner end face 2122 of the first step portion II 212 and the end face 113 of the coreless motor stator assembly 11, i.e. the length of the first gap 311 in the axial direction, is L1 in the range of 0.3 mm to 0.5 mm; the distance between the outer wall 2132 of the first potting shaft 213 and the inner wall 115 of the coreless motor stator assembly 11, i.e. the width of the second gap 321 in the radial direction, ranges from 0.02 mm to 0.05 mm. In some embodiments, the length of the first step portion I 211 in the axial direction is between 8% and 10% of the length of the potting fixture in the axial direction. The length of the first step portion II 212 in the axial direction may be such that: after the potting fixture is inserted into the housing 13, the axial spacing between the inner end face 2122 of the first step portion II 212 and the end face 113 of the stator assembly 11, i.e. the length of the first gap 311 in the axial direction, maybe in the range of 0.3 mm to 0.5 mm.

In some embodiments, the first potting head 210 is provided with first pouring holes 51; the first pouring holes 51 extend in the axial direction from the outer end face 2112 of the first step portion I 211 to the inner end face 2122 of the first step portion II 212 to communicate the first gap 311 and the second gap 321 with the space outside the coreless motor when the first potting head 210 abuts against the housing 13 of the coreless motor.

In some embodiments, the first pouring holes 51 are provided with first pouring openings 511 on the outer wall 2121 of the first step portion II 212, the first pouring openings 511 extending from the inner end face 2111 of the first step portion I 211 to the inner end face 2122 of the first step portion II 212.

In a particular implementation, the first pouring holes 51 are fan-ring shaped in radial cross-section. The fan-ring outer diameter ΦP2 of the first pouring holes 51 is the same as the inner diameter of the coreless motor housing 13. The fan-ring central angle α of the first pouring holes 51 is 20°-30°. The difference between the fan-ring outer diameter ΦP2 of the first pouring holes 51 and the fan-ring inner diameter ΦQ2 of the first pouring holes 51 is 0.5 mm.

In some embodiments, the first potting head 210 further includes a first groove 214 extending in an axial direction from the outer end face 2112 of the first step portion I 211 toward the inner end face 2111 of the first step portion I 211, and the first pouring holes 51 extend in the axial direction from the outer end face 2112 of the first step portion I 211 to the inner end face 2122 of the first step portion II 212; the first pouring holes 51 are provided with glue overflow openings 512 on the inner wall 2141 of the first groove 214, and the glue overflow openings 512 extends from the outer end face 2112 of the first step portion I 211 to the end face 2142 of the first groove 214.

In particular embodiments, the inner diameter ΦM of the first groove 214 is the same as the fan-ring inner diameter ΦQ2 of the first pouring holes 51, so as to realize the design that the first pouring holes 51 open glue overflow openings 512 on the inner wall 2141 of the first groove 214. In some embodiments, the first potting head 210 further includes a second groove 215 extending in an axial direction from the end face 2142 of the first groove 214 toward the inner end face 2122 of the first step portion II 212, the second groove 215 having an inner diameter ΦN that is less than the inner diameter ΦM of the first groove 214.

In a specific embodiment, the difference between the inner diameter ΦM of the first groove and the inner diameter ΦN of the second groove is 1 mm.

The length L4 of the first groove in the axial direction is 1 mm, and the length L5 of the second groove in the axial direction is 1 mm.

Figure 9:
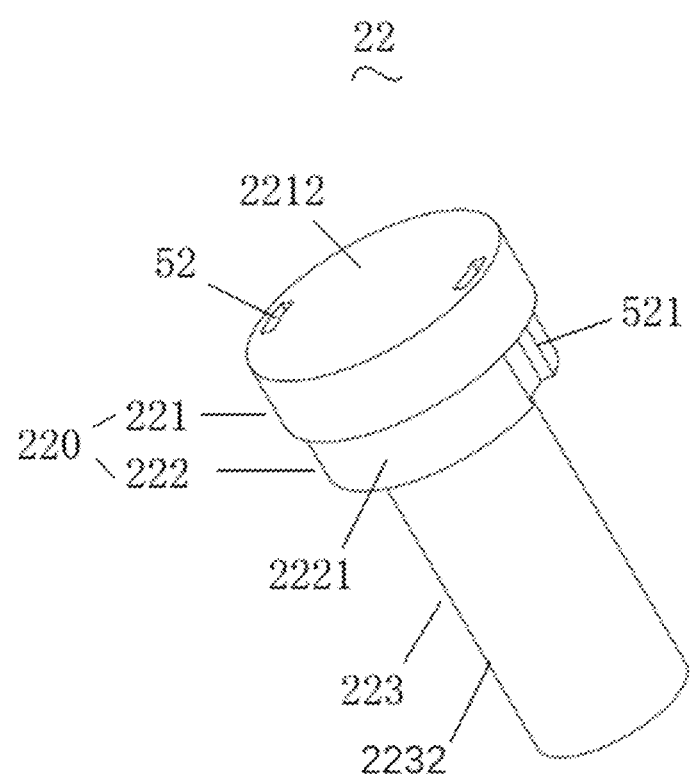
FIG. 9 is a schematic view of a second potting fixture in accordance with an embodiment of the present disclosure.
Figure 11:
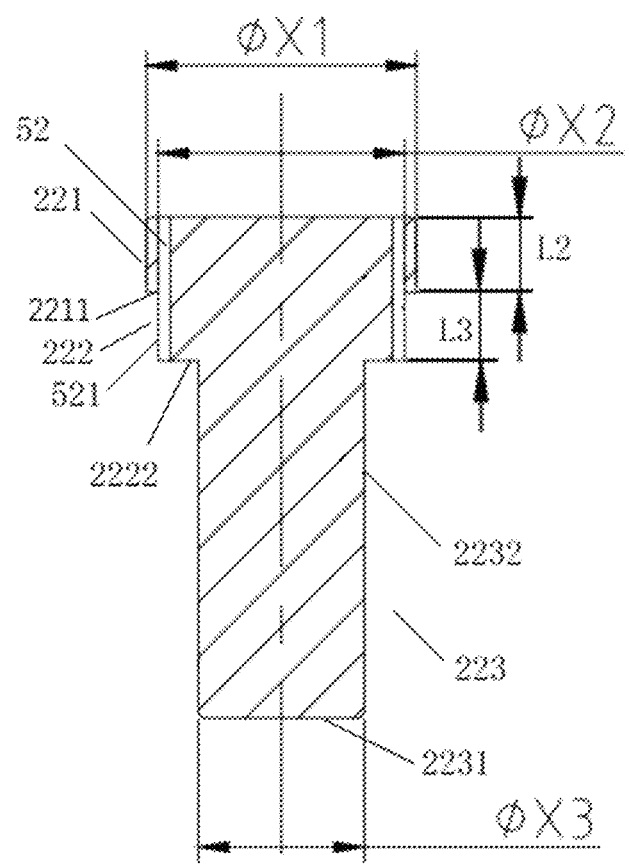
FIG. 11 is a sectional view B-B of the structure shown in FIG. 10.

Referring to FIGS. 9 to 11, another embodiment of a potting fixture is a second potting fixture 22. The second potting fixture 22 includes a second potting head 220 and a second potting shaft 223, wherein the second potting head 220 and the second potting shaft 223 are sequentially provided in an axial direction; the second potting head 220 is adapted to abut against the housing 13 of the coreless motor and is provided at intervals from the end face 114 of the coreless motor stator assembly 11; the second potting shaft 223 is adapted to be inserted into the cavity 110 of the coreless motor stator assembly 11 when the second potting head 220 abuts against the coreless motor housing 13, and is provided at intervals from the inner wall 115 of the coreless motor stator assembly 11; a third gap 312 is formed between the second potting head 220 and the end face 114 of the coreless motor stator assembly 11, a fourth gap 322 is formed between the second potting shaft 223 and the inner wall 115 of the coreless motor stator assembly 11, and the third gap 312 is in communication with the fourth gap 322.

In some embodiments, the second potting head 220 includes a second step portion I 221 and a second step portion II 222, wherein the second step portion I 221 and the second step portion II 222 are sequentially provided in an axial direction, the outer diameter ΦX1 of the second step portion I 221 is greater than the outer diameter ΦX2 of the second step portion II 222; when the second potting shaft 223 is provided within the cavity 110 of the coreless motor stator assembly 11, the inner end face 2211 of the second step portion I 221 is adapted to abut against the end face 134 of the housing 13 of the coreless motor and the outer wall 2221 of the second step portion II 222 is adapted to abut against the inner wall 130 of the coreless motor housing 13 such that the inner end face 2222 of the second step portion II 222 is provided at intervals from the end face 114 of the coreless motor stator assembly 11 to form the third gap 312. The outer wall 2232 of the second potting shaft 223 is provided at intervals from the inner wall 115 of the coreless motor stator assembly 11 to form a fourth gap 322. The third gap 312 is in communication with the fourth gap 322. In particular embodiments, the outer diameter $\Phi X2$ of the second step portion II 222 is the same as the inner diameter of the coreless motor housing 13. The outer diameter $\Phi X3$ of the second potting shaft 223 is the same as the outer diameter $\Phi Y3$ of the first potting shaft 213 and is smaller than the inner diameter of the stator assembly 11.

In some embodiments, the distance between the inner end face 2222 of the second step portion II 222 and the end face 114 of the coreless motor stator assembly 11, i.e. the length of the third gap 312 in the axial direction, is L1 in the range of 0.3 mm to 0.5 mm; the distance between the outer wall 2232 of the second potting shaft 223 and the inner wall 115 of the coreless motor stator assembly 11, i.e. the width of the fourth gap 322 in the radial direction, ranges from 0.02 mm to 0.05 mm.

In some embodiments, the length L2 of the second step portion I 221 in the axial direction is between 8% and 10% of the length of the potting fixture in the axial direction. The length of the second step portion II 222 in the axial direction is L3, which satisfies: after the potting fixture is inserted into the housing 13, the axial spacing between the inner end face 2222 of the second step portion II 222 and the end face 114 of the stator assembly 11, i.e. the length of the third gap 312 in the axial direction, maybe in the range of 0.3 mm to 0.5 mm.

In some embodiments, the second potting head 220 is provided with second pouring holes 52; the second pouring holes 52 extend in the axial direction from the outer end face 2212 of the second step portion I 221 to the inner end face 2222 of the second step portion II 222 to communicate the third gap 312 and the fourth gap 322 with the space outside the coreless motor when the second potting head 220 abuts against the housing 13 of the coreless motor.

In some embodiments, the second pouring holes 52 are provided with second pouring openings 521 on the outer wall 2221 of the second step portion II 222, the second pouring openings 521 extending from the inner end face 2211 of the second step portion I 221 to the inner end face 2222 of the second step portion II 222.

In a particular implementation, the second pouring holes 52 are fan-ring shaped in radial cross-section. The fan-ring outer diameter $\Phi P1$ of the second pouring holes 52 is the same as the inner diameter of the coreless motor housing 13. The fan-ring central angle $\beta$ of the second pouring holes 52 is 20°-30°. The difference between the fan-ring outer diameter $\Phi P1$ of the second pouring holes 52 and the fan-ring inner diameter $\Phi Q1$ of the second pouring holes 52 is 0.5 mm. Based on the same inventive concept, embodiments of the present disclosure also provide a coreless motor manufactured by the above coreless motor potting method.

The coreless motor includes a stator assembly 11, a rotor assembly 12, and a housing 13, wherein the stator assembly 11 is provided in the housing 13 and is provided with a cavity 110 penetrating in an axial direction, the rotor assembly 12 is rotatably provided through the cavity 110, two ends of the housing 13 are adapted to extend from two ends of the stator assembly 11 in the axial direction, and the coreless motor further includes an encapsulation layer 14, and the encapsulation layer 14 is adapted to encapsulate the stator assembly 11 on an inner wall 130 of the housing 13.

It should be noted that the values in the axial direction and the values in the radial direction allow a certain range of tolerances. In some embodiments, the tolerance may be 0.01 mm.

Finally, it should be noted that the axial direction, the radial direction, and the circumferential direction of the embodiment of the present disclosure represent the directions of the axial direction, the radial direction, and the circumferential direction of the stator assembly 11, respectively.

While specific embodiments have been described above, these embodiments are not intended to limit the scope of the disclosure, even if a single embodiment is described with respect to only certain features. The examples of features provided in this disclosure are intended to be illustrative, and not limiting, unless expressed differently. In a specific implementation, the technical features of one or more dependent claims may be combined with the technical features of the independent claims as technically feasible according to practical requirements, and the technical features from the respective independent claims may be combined in any suitable manner and not merely by the specific combinations enumerated in the claims.

Although the present disclosure is disclosed above, the present disclosure is not limited thereto. Various changes and modifications may be effected by one skilled in the art without departing from the spirit and scope of the invention, which is intended to be limited only by the scope of the appended claims.

What is claimed is:

1. A potting method of a coreless motor, the coreless motor comprising a stator assembly, a rotor assembly, and a housing, the stator assembly being provided within the housing and being provided with a cavity extending in an axial direction therethrough, the rotor assembly being rotatably provided through the cavity, comprising the steps of:
   a. providing the stator assembly and the housing, sleeving the housing on an outer wall of the stator assembly, and controlling two ends of the housing to extend out of two ends of the stator assembly in an axial direction;
   b. providing potting tooling, wherein the potting tooling comprises a potting fixture, the potting fixture comprises a first potting fixture, the first potting fixture comprises a first potting head and a first potting shaft, and the first potting head and the first potting shaft are sequentially provided in an axial direction; the potting fixture comprises a second potting fixture, the second potting fixture comprises a second potting head and a second potting shaft, and the second potting head and the second potting shaft are sequentially provided in an axial direction;
   c. inserting the first potting fixture and the second potting fixture into one end and the other end of the housing in an axial direction, respectively, so that the first potting head and the second potting head abut against the housing, and are provided at intervals from one end face and the other end face of the stator assembly, respectively, so that the first potting shaft and the second potting shaft are inserted into the cavity, and are provided at intervals from the inner wall of the stator assembly;

d. controlling an end face of the first potting shaft and an end face of the second potting shaft to abut against each other; forming a potting space between the potting fixture, two end faces of the stator assembly and the inner wall of the stator assembly;

e. injecting glue into the potting space via the first potting head and the second potting head to form an encapsulation layer to encapsulate the stator assembly on an inner wall of the housing.

2. The potting method of claim 1, wherein the first potting head comprises a first step portion I and a first step portion II, the first step portion I and the first step portion II are sequentially provided in an axial direction, an outer diameter of the first step portion I is greater than an outer diameter of the first step portion II; in the step c, after the first potting fixture is inserted into one end of the housing in the axial direction, an inner end face of the first step portion I abuts against one end face of the housing, and an outer wall of the first step portion II abuts against an inner wall of the housing so as to block one end of the housing, and an inner end face of the first step portion II is provided at intervals from an end face of the stator assembly to form a first gap, and an outer wall of the first potting shaft is provided at intervals from the inner wall of the stator assembly to form a second gap.

3. The potting method of claim 2, wherein the first potting head is provided with first pouring holes, the first pouring holes extend in the axial direction from an outer end face of the first step portion I to an inner end face of the first step portion II, in step c, the first potting fixture is inserted in the axial direction to block an end of the housing, the first gap and the second gap are in communication with a space outside the housing through the first pouring holes, and the lead wires extending from an end face of the stator assembly pass through the first pouring holes and then extend out of the first potting head; in the step e, the glue is injected into the first gap and the second gap via the first pouring holes.

4. The potting method of claim 1, wherein the second potting head comprises a second step portion I and a second step portion II, the second step portion I and the second step portion II are sequentially provided in the axial direction, an outer diameter of the second step portion I is greater than an outer diameter of the second step portion II; in the step c, after the second potting fixture is inserted into the other end of the housing in the axial direction, the inner end face of the second step portion I abuts against the other end face of the housing, and an outer wall of the second step portion II abuts against the inner wall of the housing so as to block the other end of the housing, and an inner end face of the second step portion II is provided at intervals from the other end face of the stator assembly to form a third gap, and an outer wall of the second potting shaft is provided at intervals from the inner wall of the stator assembly to form a fourth gap.

5. The potting method of claim 4, wherein the second potting head is provided with a second pouring holes, the second pouring holes extend in the axial direction from an outer end face of the second step portion I to an inner end face of the second step portion II, and in step c, the second potting fixture is inserted in the axial direction to block the other end of the housing, and the third gap and the fourth gap are in communication with a space outside the housing through the second pouring holes; in the step e, the glue is injected into the third gap and the fourth gap via the second pouring holes.

6. The potting method of claim 1, wherein before the potting fixture is inserted into two ends of the housing, the outer wall of the first potting shaft and the outer wall of the second potting shaft are coated with a first membrane and a second membrane, respectively, and in step e, after the glue is poured into the potting space, the first membrane and the second membrane are fixed to the inner wall of the stator assembly by the glue.

7. Potting tooling for the potting method of a coreless motor of any claim 1, comprising a potting fixture, the potting fixture comprising a potting head and a potting shaft, the potting head and the potting shaft being sequentially provided in an axial direction; wherein the potting head is adapted to abut against a housing of the coreless motor and to be provided at intervals from an end face of a coreless motor stator assembly; the potting shaft is adapted to be inserted into a cavity of the coreless motor stator assembly when the potting head abuts against the housing of the coreless motor, and is provided at intervals from the inner wall of the coreless motor stator assembly; the potting head, the potting shaft, the inner wall of the coreless motor stator assembly and an end face of the coreless motor stator assembly form a potting space therebetween.

8. The potting tooling of claim 7, wherein the potting head comprises a step portion I and a step portion II, the step portion I and the step portion II are sequentially provided in an axial direction, an outer diameter of the step portion I is greater than an outer diameter of the step portion II; when the potting shaft is provided within the cavity of the coreless motor stator assembly, an inner end face of the step portion I is adapted to abut against an end face of the coreless motor housing, an outer wall of the step portion II is adapted to abut against an inner wall of the coreless motor housing such that the inner end face of the step portion II is provided at intervals from the end face of the coreless motor stator assembly, and the outer wall of the potting shaft is provided at intervals from the inner wall of the coreless motor stator assembly.

9. The potting tooling of claim 8, wherein the potting head is provided with pouring holes; the pouring holes extend in the axial direction from an outer end face of the step portion I to an inner end face of the step portion II to communicate the pouring space with a space outside the coreless motor when the potting head abuts against the housing of the coreless motor.

10. The potting tooling of claim 9, wherein the pouring holes are provided with pouring openings on the outer wall of the step portion II, the pouring openings extend from the inner end face of the step portion I to the inner end face of the step portion II.

11. The potting tooling of claim 9, wherein the pouring holes are fan-ring shaped in radial cross-section.

12. The potting tooling of claim 11, wherein the fan-ring outer diameter of the pouring hole is the same as the inner diameter of the coreless motor housing.

13. The potting tooling of claim 11, wherein the fan-ring central angle of the pouring hole is 20°-30°.

14. The potting tooling of claim 9, wherein the potting head comprises a first groove, the first groove extends in the axial direction from the outer end face of the step portion I toward the inner end face of the step portion I; the pouring holes are provided with glue overflow openings on the inner wall of the first groove, and the glue overflow openings extend from the outer end face of the step portion I to the end face of the first groove.

15. The potting tooling of claim 14, wherein the potting head further comprises a second groove, the second groove extends in the axial direction from an end face of the first groove toward the inner end face of the step portion II, the inner diameter of the second groove is smaller than the inner diameter of the first groove.

16. A coreless motor produced by the potting method of a coreless motor of claim 1, comprising a stator assembly, a rotor assembly, and a housing, the stator assembly being provided within the housing and being provided with a cavity extending in an axial direction therethrough, the rotor assembly being rotatably provided through the cavity, wherein two ends of the housing are adapted to extend in the axial direction out of two ends of the stator assembly, the coreless motor further comprising an encapsulation layer, the encapsulation layer being adapted to encapsulate the stator assembly on an inner wall of the housing.

\* \* \* \* \*